United States Patent [19]
Westerfield

[11] 4,374,500
[45] Feb. 22, 1983

[54] SEED PLANTER DEPTH CONTROL

[75] Inventor: Lawerence D. Westerfield, Romeoville, Ill.

[73] Assignee: International Harvester Co., Chicago, Ill.

[21] Appl. No.: 265,515

[22] Filed: May 20, 1981

[51] Int. Cl.³ .............................................. A01C 5/00
[52] U.S. Cl. ...................................... 111/85; 74/527; 74/532; 111/88; 172/430
[58] Field of Search ..................... 33/185 V; 116/334; 172/239, 429, 430; 111/85, 88

[56] References Cited
U.S. PATENT DOCUMENTS

| | | | |
|---|---|---|---|
| 1,308,574 | 7/1919 | Brady | 116/334 |
| 2,654,339 | 10/1953 | Sperling | 172/430 X |
| 2,900,836 | 8/1959 | Gleeson et al. | 74/532 X |
| 4,009,668 | 3/1977 | Brass et al. | 111/85 |

OTHER PUBLICATIONS (Anon.), *OM Operator's Manual John Deere 7100 Mounted Max-Emerge Planters OM-A33814 Issue C7 Pub.:* John Deere, (publication date unknown), pp. 22,23,72,73,76,86 & 132.
(Anon.), *7000 Max-Emerge Drawn Planters Parts Catalog*, Plow and Planter Works, PC-1467, (Pub.), John Deere, Feb. 1981, pp. 10-3, 110-6, 110-7.

*Primary Examiner*—James R. Feyrer
*Attorney, Agent, or Firm*—Dennis K. Sullivan; F. David Aubuchon

[57] ABSTRACT

A planter to be towed that includes a frame supported, rotatably mounted furrow forming disks that are arranged to substantially contact each other at the approximate point of entry into the soil and diverge apart rearwardly and upwardly, a seed tube for depositing seed into the furrow, a pair of rotatable gauge wheels having supports that individually and pivotally connect the wheels to the frame with each wheel being located generally adjacent an outer surface of a disk, furrow closing structure mounted rearwardly of the disks and gauge wheels, gauge wheel adjustment structure including a lever pivotally mounted on said frame and having one end adapted to engage and move the wheel supports, a slide for moving the other end of the lever, a plate having a plurality of equally spaced holes, a handle resiliently mounted on the slide and having structure to engage the holes to set and maintain furrow depth and adjustment structure for movably mounting the plate on the frame wherein when the disks and wheels contact a level surface the zero position hole is engaged by the handle structure and the plate fixed to the frame for accurate furrow depth control.

5 Claims, 4 Drawing Figures

SEED PLANTER DEPTH CONTROL

BACKGROUND OF THE INVENTION

1. Field of the Invention

This invention pertains generally to agricultural planting equipment.

2. Description of the Prior Art

Furrow depth, and hence planting depth of seeds in a furrow, which is the vertical distance therefrom to the top of the uniform soil covering of the seeds, is critical for successful crop production. Most planters, therefore, require structure that will provide accurate furrow depth control. Most commonly dual disk openers are utilized to create the furrow for the seed deposited therein via a seed tube, with a gauge wheel positioned adjacent but outward each disk with the wheel axis rearward of the disk axis and generally in line where the disk exits the soil. Various structure may be utilized to close the furrow. The gauge wheels are rotatably mounted on arms which are pivotally mounted on the planter frame. By moving the arms in one direction the gauge wheel positions relative to the frame are changed exposing less of the disks to decrease furrow depth. Movement in a contrary direction increases furrow depth by exposing more of the disks.

Various types of structures are used to move the arms to achieve depth control. A popular type provides a lever pivotally mounted on the frame that has an end that contacts both arms, each of which is individually pivotally mounted on the rear of the frame from the disks but which is forwardly extending with the gauge wheel at the other end. The other end of the lever is mounted for movement in the frame and has structure to engage, as desired, a series of fixed holes to provide and maintain the depth control selected. While the depth control provided by the structure noted above is adequate, yet problems arise when a series of like planters are mounted at spaced intervals on a transversely extending tool bar. To achieve the desired depth control, seeds are planted and the planting depth measured and thus a hole is selected until the related furrow depth, which is the elevational distance between the gauge wheel impressions and disks, is located. However, utilizing this same hole in an adjacent planter frequently will not achieve the same depth due to planter production tolerances and possibly mounting tolerances due to the tool bar deflection. Thus, the same procedure for the other planters must be followed which is time consuming. Of course, if furrow depth is changed, as is frequently necessary due to different seeds being planted or changing soil conditions, this same lengthy procedure must be followed.

SUMMARY OF THE INVENTION

Applicant, as a consequence, designed a planter depth control that eliminates the problems detailed above. Generally, Applicant provides structure wherein furrow depth control can be zeroed in the field while the planter is mounted on a tool bar to compensate for manufacturing tolerances, mounting tolerances and changes in planter structure so that the desired furrow depth set in a specific hole can also be utilized in other zero set planters wherein all the planters will provide the same furrow depth. When the furrow depth is changed, and another hole selected, this same hole setting can be also utilized in the other zero set planters and the same depth achieved without planting and measuring.

Specifically, Applicant has replaced the fixed set of holes of the cast structure of the prior art with a movable plate having generally similar holes staggered on both sides of a longitudinal opening for the other end of the lever and slide structure for moving same. A pair of spaced slotted holes elongated in the direction of travel of the slide and suitable fasteners provide adjustment for the plate. To zero set the planter, the lever, via a resiliently mounted handle attached to the slide is moved until the disks and wheels touch a level surface. This is the zero furrow depth position. The plate then is moved via the slotted holes until the zero hole is in line with the handle structure that engages same. The fasteners are then tightened to rigidly secure the plate to the frame. With the zero furrow depth now achieved, any setting selected, which moves the slide in an opposite direction in this case rearward, for increased depth, causes the arms to follow the lever end in contact therewith due to the weight of the planter. Movement in the opposite direction for reduced furrow depth also maintains the lever ends in contact with the arms for accurate depth control. As is apparent, the adjustment can be utilized as often as is necessary unlike fixed zeroing structure utilized during planter assembly.

It is, therefore, an object of this invention to provide a new and improved seed planter depth control.

Another object is to provide a planter that when a furrow depth is zero set all like set planters having the same control create the same furrow depth.

Another object is to provide a seed planter depth control that can be zero set in the field.

BRIEF DESCRIPTION OF THE DRAWINGS

FIG. 4 is a plan view taken along line 4—4 of FIG. 1.

DESCRIPTION OF THE PREFERRED EMBODIMENT

Figure 1:
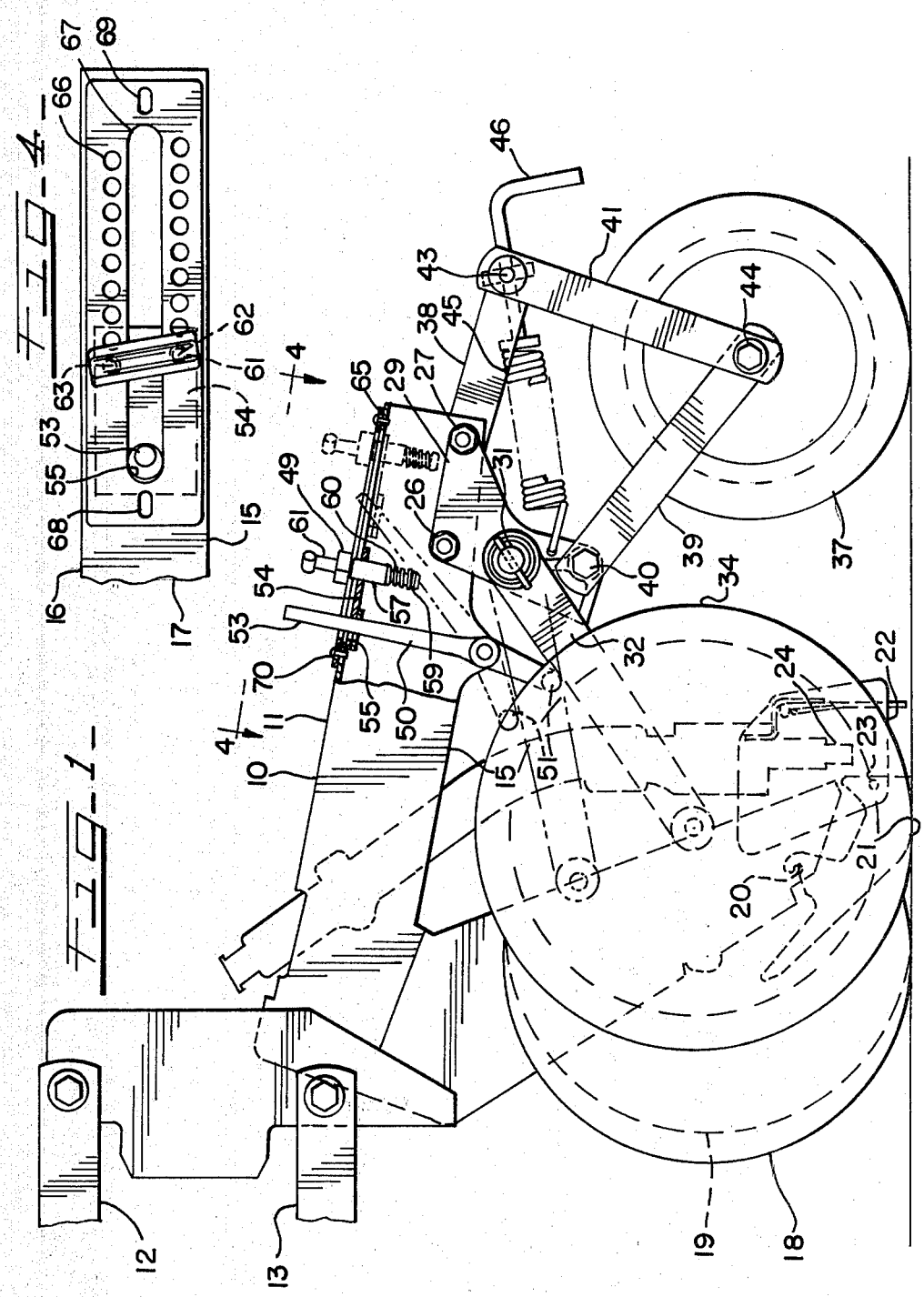
FIG. 1 is a side elevational view partially cut away of the seed planter depth control of this invention.

Referring to FIGS. 1, 2, 3 and 4, 10 indicates a seed planter. Planter 10 has a frame 11. Frame 11 has upper and lower links 12 and 13 pivotally connected thereto and adapted for connection to a tool bar (not shown). The tool bar would normally be connected to a tractor for towing. Frame 11 is a weldment that provides the necessary structure for all elements of the planter. Frame 11 includes left sheet 15 and right sheet 16 which are connected by upper channel 17.

Rotatably mounted on the lower portions of sheet 15 and 16 by suitable bearings are left furrow forming disk 18 and right furrow forming disk 19 respectively. Preferably the axes of the disks are staggered longitudinally with the left disk forward for ease in cutting through trashy soil. The axes are also inclined so that the disks substantially contact each other forward of their axes and diverge apart rearwardly and upwardly.

Located between the disks and supported from frame 11 by pin 20 is compaction runner 21. Runner 21 has a lower V-shaped configuration that extends slightly below the disks to provide the desired firmed furrow configuration. Runner 21 is also supported on rearward deflector or shoe 22 via pin 23 with shoe 22 being attached to sheets 15 and 16 by suitable fasteners. Shoe 22 is also spaced for seed tube 24 which extends therebetween to drop seed rearward of the V-shaped portion of the runner 21 into the furrow.

Located rearwardly of the axes of the disks on frame 11 and connected between sheets 15 and 16 by bolts 26 and 27 and suitable nuts is gauge wheel mounting 29. Mounting 29 has left pin 31 and a similar right pin. The pins are preferably threaded into mounting 29 on axes generally parallel to the disk axes. Pivotally mounted on pin 31 and maintained thereon by suitable fasteners is left arm support 32 and a right arm support is similarly mounted on the right pin. Rotatably mounted on an end extending forwardly from pin 31 is gauge wheel 34. Gauge wheel 35 is similarly mounted on similar right support arm.

Located rearwardly of mounting 29 is furrow closing wheel 37. Wheel 37 has an inner taper that closes the furrow created by the disks and also compresses the soil to remove air pockets. Wheel 37 is supported from gauge wheel mounting 29 by upper links 38 which are pivotally connected to the mounting at bolt 27 and by lower links 39 by bolts 40. Extending between the links is wheel support links 41 which are also pivotally connected thereto at 43 and 44 to form a parallel link arrangement to allow wheel 37 to follow the ground contour. Tension spring 45 having one end hooked through an opening in mounting 29 and the other end connected to an adjustment rod 46 threaded into a trunnion pivotally mounted on link 41 and connected to the spring resiliently biases wheel 37 toward the furrow. Rod 46 provides adjustment for the spring down pressure of wheel 37.

Figure 2:
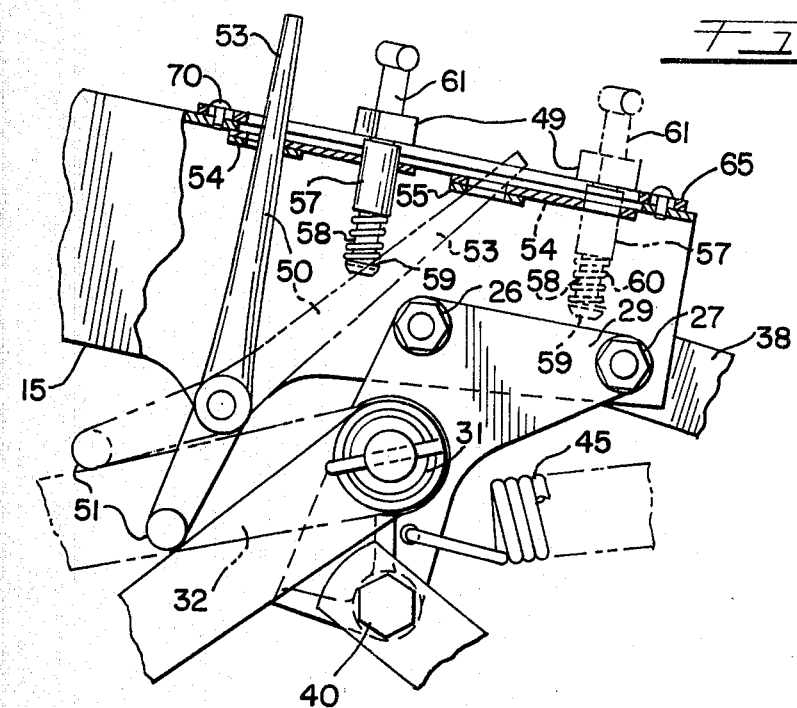
FIG. 2 is an enlarged view of a portion of FIG. 1.
Figure 3:
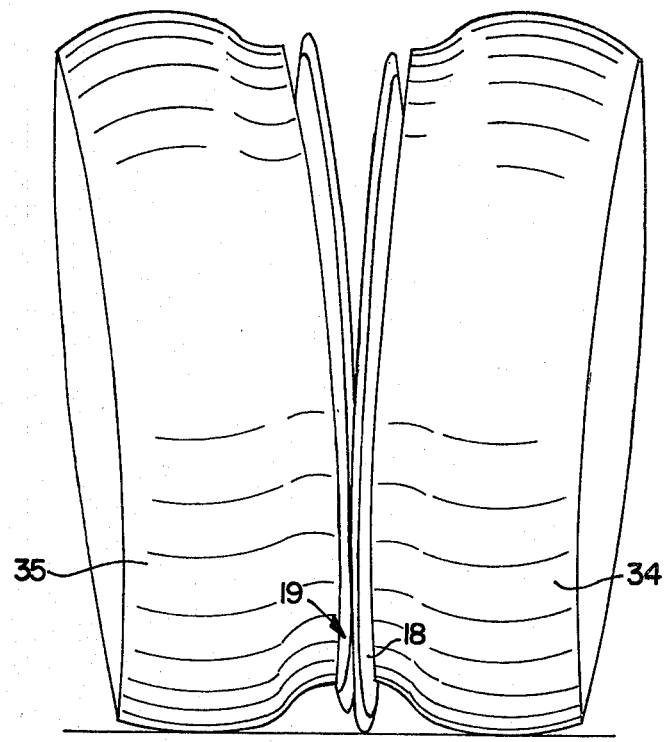
FIG. 3 is a partial front view of the planter.

Gauge wheel adjustment mechanism 49 is shown best in FIGS. 1 and 2. Mechanism 49 includes lever 50 pivotally mounted between sheets 15 and 16 of frame 11. Lever 50 has a lower end 51 for contacting left arm support 32 and the similar right arm support between the connection of the supports to the gauge wheels and the pivotal mounting of lever 50 to the frame. The upper end 53 of lever 50 extends above frame 11.

Slidably mounted on frame 11 is slide 54. Slide 54 has an opening 55 for capturing and moving the upper end 53 of lever 50. Also rigidly attached to slide 54 is sleeve 57 which movably houses pin 58 having shoulder 59. Spring 60 extending between shoulder 59 and sleeve 57 biases the pin downward and also the attached handle structure 61 of the pin which has a pair of laterally spaced prongs 62 and 63. Plate 65 has a series of longitudinal staggered holes 66 on both sides of opening 67 for the upper end 53 of lever 50 which extends above frame 11 for engagement by prongs 62 and 63 of handle structure 61.

As shown in FIGS. 1 and 4, the planter 10 is in zero furrow depth position with the gauge wheels and disks at the same elevation. The corresponding lever 50 position is shown in solid lines. If it is desired to increase the furrow depth, handle portion 61 and therefore prongs 62 and 63 is pulled upwardly against the action of spring 60 and the handle portion 61 is moved rearwardly with the slide 54 pulling lever 50 rearwardly about its pivot. Lever lower end 51 then raises and due to the weight of the planter, the left arm 32 and the right arm and associated wheels rise in contact therewith allowing the disks 18 and 19 to penetrate the soil. When handle 61 is released and prongs 62 and 63 engage the selected holes 66, the depth setting selected is maintained. By walking the handle on alternate sides of opening 67, fine depth adjustment is possible due to the staggered holes. Moving handle portion 61 in a forward direction lowers the wheels and reduces the furrow depth.

Since most planting implements utilize a plurality of planter row units spaced as desired along a tool bar, it is desirable that all planters plant at the same depth when the same hole setting is utilized. Applicant, therefore, has supplied adjustment structure to achieve this goal. Plate 45 is, therefore, provided with spaced fore and aft slotted holes 68 and 69 and capscrews 70 for selectively correcting plate 45 to frame 11.

In operation to achieve the accurate depth control, it is necessary to zero set all of the planters prior to use if required. This is accomplished by moving lever 50 forward and lowering the planter to a level surface with the disks and gauge wheels contacting same as shown in FIG. 1. The runner, if used, will pivot on its supports to accommodate this action. The plate then is moved via the slotted holes until the first or zero hole 66 is aligned with prong 63 and the capscrews 70 tightened until plate 65 is rigid with frame 11. Prong 62 then engages the next hole on the opposite side of opening 67 to securely position lever 50 relative to frame 11. The planter is then zero set. Upon moving the lever via the handle position to other hole positions, the furrow depth is increased. Since the left arm support 31 and right arm support of each planter will remain against lower end 51 of lever 50 for all furrow depths, all zero set planters will provide the same furrow depth for the same hole selected. No further planting, measuring seed depth, and adjustment of the planters is required.

What is claimed is:

1. A seed planter depth control comprising:
   (a) a frame, said frame being adapted to be attached for towing to a mobile power source;
   (b) a pair of opposed, furrow forming disks rotatably mounted on said frame with the disks substantially contacting each other at the approximate point of entry into the soil and diverging apart rearwardly and upwardly relative to the direction of travel;
   (c) a seed tube supported from said frame rearward of said furrow forming disks, one end of said tube extending toward the furrow and the other end being adapted for connection to a seed dispenser;
   (d) a pair of gauge wheels means individually mounted on said frame for regulating furrow depth, each means including a support pivotally mounted on said frame, a wheel located generally adjacent an outer surface of a disk and rotatably mounted on said support on an axis rearward of the disk axis of rotation;
   (e) furrow closing means mounted on said frame rearwardly of said disks and gauge wheels;
   (f) gauge wheel adjustment means, including a lever pivotally mounted on said frame and having one end adapted to engage said wheel supports, a slide for moving the other end of said lever, a plate having a plurality of equally spaced holes, and a handle resiliently mounted on said slide and having structure to engage said holes to set and maintain desired furrow depth; and
   (g) adjustment means for movably mounting said plate on said frame, said means including a longitudinally spaced and substantially aligned pair of elongated holes in said plate and complementary fasteners to selectively secure said plate to said frame whereby when said disks and wheels are contacting a level surface and said plate is moved until a zero position hole is engaged by said handle structure, said plate can be fixed to said frame wherein accurate furrow depth control is achieved.

2. The planter of claim 1 in which said holes are elongated in the direction of travel of said slide.

3. The planter of claim 2, in which said holes are located on both sides of the other end of said lever in a staggered pattern to provide fine depth control.

4. The planter of claim 3, in which said handle structure is adapted to simultaneously engage holes on each side of said other end of said lever.

5. The planter of claim 4, in which said furrow depth is increased as said handle is moved rearwardly and decreased as said handle is moved forwardly.

* * * * *